United States Patent [19]

Friebe et al.

[11] Patent Number: 5,914,382
[45] Date of Patent: Jun. 22, 1999

[54] PROCESS FOR THE CHAIN EXTENSION OF α,ω-DIHYDROXYPOLY(DIORGANOSILOXANES), CROSSLINKABLE MIXTURES CONTAINING CHAIN EXTENDED α,ω-DIHYDROXYPOLY-(DIORGANOSILOXANES) AND THEIR USE

[75] Inventors: Robert Friebe; Karl-Heinz Sockel, both of Leverkusen, Germany

[73] Assignee: GE Bayer Silicones GmbH & Co. KG, Erkrath, Germany

[21] Appl. No.: 08/967,535

[22] Filed: Nov. 10, 1997

Related U.S. Application Data

[63] Continuation of application No. 08/709,433, Sep. 6, 1996, abandoned.

[30] Foreign Application Priority Data

Sep. 13, 1995 [DE] Germany ............... 195 33 892

[51] Int. Cl.⁶ .................................................. C08G 77/08
[52] U.S. Cl. ............................ 528/23; 528/17; 528/18; 528/34; 528/901
[58] Field of Search ......................... 528/23, 17, 18, 528/34, 901

[56] References Cited

U.S. PATENT DOCUMENTS

| | | | |
|---|---|---|---|
| 3,160,601 | 12/1964 | Hyde | 528/23 |
| 3,819,549 | 6/1974 | Imai et al. | 528/23 |
| 4,147,855 | 4/1979 | Schiller et al. | 528/23 |
| 4,507,437 | 3/1985 | Kato et al. | 525/106 |
| 4,508,887 | 4/1985 | Kohl | 528/21 |
| 4,657,978 | 4/1987 | Wakabayashi et al. | 525/100 |
| 4,727,127 | 2/1988 | Suzuki | 528/18 |
| 4,990,555 | 2/1991 | Trego | 524/424 |
| 5,073,618 | 12/1991 | Westall | 528/13 |
| 5,371,165 | 12/1994 | Patrick et al. | 528/23 |
| 5,728,794 | 3/1998 | Friebe et al. | 528/23 |

FOREIGN PATENT DOCUMENTS

| | | |
|---|---|---|
| 1770843 | 1/1972 | Germany . |
| 1582800 | 1/1981 | United Kingdom . |
| 9501983 | 1/1995 | WIPO . |

*Primary Examiner*—Margaret W. Glass
*Attorney, Agent, or Firm*—Sprung Kramer Schaefer & Briscoe

[57] ABSTRACT

In the chain extension of a low molecular weight α,ω-dihydroxypoly(diorganosiloxane) wherein the siloxane is contacted with a chain extension catalyst, the improvement wherein said catalyst comprises at least one phosphoric acid ester, orthophosphoric acid, or a salt thereof. The reaction proceeds rapidly and, when complete, the catalyst can easily be deactivated to prevent degradation and/or rearrangement.

8 Claims, No Drawings

PROCESS FOR THE CHAIN EXTENSION OF α,ω-DIHYDROXYPOLY (DIORGANOSILOXANES), CROSSLINKABLE MIXTURES CONTAINING CHAIN EXTENDED α,ω-DIHYDROXYPOLY-(DIORGANOSILOXANES) AND THEIR USE

This application is a continuation of application Ser. No. 08/709,433, filed on Sep. 6, 1996 which is now abandoned.

The present invention relates to a process for the chain extension of α,ω-dihydroxypoly(diorganosiloxanes) in which low molecular weight α,ωdihydroxypoly (diorganosiloxanes) are reacted with at least one phosphoric acid ester and/or orthophosphoric acid, to crosslinkable mixtures containing chain extended α,ω-dihydroxypoly (diorganosiloxanes) and to the use of the resultant α,ω-dihydroxypoly(diorganosiloxanes).

Various processes are known for the production of α,ω-dihydroxypoly(diorganosiloxanes). Most industrially significant processes are based on the hydrolysis of organohalosilanes and subsequent condensation and polymerization of the hydrolysis products, which consist of low molecular weight dihydroxydiorganosiloxanes and cyclic siloxanes. The condensation and polymerization reactions conventionally proceed in the presence of suitable catalysts, such as for example strong acids and bases. Industrial production of these products is usually performed at temperatures of above 80° C.

α,ω-Dihydroxypoly(diorganosiloxanes) are used in many different industrial applications. Depending upon the particular application, the consistency of the products used varies from low viscosity polymers to high viscosity elastic materials. One important application of such polymers is one and two component silicone compositions, hereinafter respectively referred to as RTV-1 and 2 compositions (room temperature vulcanizing 1 and 2 component compositions), which cure to yield elastomers under the action of water or on exposure to atmospheric moisture.

It is desirable in certain applications to have suitable processes which make it possible to produce α,ω-dihydroxypoly(diorganosiloxanes) of a defined chain length during the course of the production of the corresponding formulations or products which contain them. Suitable processes must here be distinguished by short reaction times, low temperatures and elevated yields of the desired final products. It is particularly important that no cyclic polysiloxanes are formed in the final products, as is the case with many known catalysts.

Such a process is known from EP-A 314 315 which is based on the condensation of α,ω-dihydroxypoly (diorganosiloxanes) in the presence of sulphonic acids, in particular of dodecylbenzenesulphonic acid.

The object of the present invention is to provide a process for the chain extension of α,ω-dihydroxypoly (diorganosiloxanes) which yields the desired higher molecular weight α,ω-dihydroxypoly(diorganosiloxanes) after short reaction times at low temperatures with elevated selectivity.

It has surprisingly now been found that it is possible within a short time to produce higher molecular weight α,ω-dihydroxypoly(diorganosiloxanes) which are adjustable in molecular weight from low molecular weight α,ω-dihydroxydiorganosiloxanes by chain extension in the presence of phosphoric acid esters and/or orthophosphoric acid. The reaction may be performed under mild conditions at temperatures as low as below 40° C. The higher molecular weight α,ω-dihydroxypoly(diorganosiloxanes) produced using the process according to the invention are particularly suitable for use in the formulation of RTV-1 and 2 compositions during the course of the production thereof.

This is all the more surprising since it is known from DE-A 26 53 499 that acidic phosphoric acid esters degrade poly(diorganosiloxanes).

The present invention accordingly provides a process for the chain extension of α,ω-dihydroxypoly (diorganosiloxanes) in which low molecular weight α,ω-dihydroxydiorganosiloxanes are reacted with at least one phosphoric acid ester and/or orthophosphoric acid.

Any known α,ω-dihydroxypoly(diorganosiloxanes) are suitable as the low molecular weight α,ω-dihydroxydiorganosiloxanes for the process according to the invention, wherein the organyl groups are $C_1$–$C_{18}$ alkyl groups, preferably methyl groups. The methyl groups may be partially replaced by vinyl, phenyl, $C_2$–$C_8$ alkyl or haloalkyl groups. The poly(diorganosiloxanes) are substantially linear, but may also contain a proportion of organosiloxy units having a branching action. The poly (diorganosiloxane) may moreover be partially substituted by unreactive groups, such as for example trimethylsiloxy groups. In a preferred embodiment of the present invention, the α,ω-dihydroxypoly(diorganosiloxanes) have a viscosity of between 10 and 150000 mPa·s, preferably between 100 and 100000 mPa·s.

The catalysts used are preferably orthophosphoric acid and/or the esters thereof of the following formula (I)

$$O=P(OR)_{3-m}(OH)_m \qquad (I),$$

where m is 0, 1, 2 or 3, preferably 1, 2, or 3, and

R is optionally substituted linear or branched $C_1$–$C_{30}$ alkyl, $C_2$–$C_{30}$ alkenyl or alkoxyalkyl, $C_5$–$C_{14}$ cycloalkyl or aryl groups or triorganylsilyl or diorganylalkoxysilyl groups, which may be identical or different within a molecule, and/or esters of polyphosphoric acid.

In another preferred embodiment of the present invention, the phosphoric acid esters are esters of orthophosphoric acid with at least one optionally substituted linear or branched $C_4$–$C_{30}$ alkyl group R.

Examples of particularly preferred phosphoric acid esters are primary and secondary esters of orthophosphoric acid such as dibutyl phosphate, di-(2-ethylhexyl)phosphate, dihexadecyl phosphate, diisononyl phosphate, monoiosdecyl phosphate, mono-(2-ethylhexyl)phosphate, di-(trimethylsilyl)phosphate and/or tertiary esters, such as tris-(trimethylsilyl)phosphate, tributyl phosphate and trioctyl phosphate.

It is also possible to use esters of polyphosphoric acid or mixtures of two or more polyphosphoric acid esters and/or orthophosphoric acid esters. Acidic or neutral salts of ortho- and polyphosphoric acid and the esters thereof, such as for example alkali metal salts, are also suitable.

The chain length or viscosity of the α,ω-dihydroxypoly (diorganosiloxanes) produced may purposefully be adjusted via the quantity of added orthophosphoric acid and/or the esters thereof, water and by processing parameters such as temperature and reaction time.

The phosphoric acid compounds are preferably used in a concentration of 0.1% to 10%, particularly preferably between 0.5% and 5%, relative to the complete mixture.

The process according to the invention is preferably performed at temperatures below 40° C., particularly preferably at room temperature. It is, however, possible to raise the reaction temperature above 40° C. and this is not excluded by the invention.

Reaction times are determined by the starting materials used and the desired degree of conversion and may range from a few minutes to several hours. In one embodiment of the invention, times of between 5 and 60 minutes are preferred during the production of RTV compositions. It has proved favorable here to determine the viscosity of the mixture over the course of the reaction. It is possible to draw conclusions as to the degree of conversion from the measured data and to terminate the reaction at a desired point in time. Viscosity measurements may here be performed both continuously and discontinuously.

In a preferred embodiment of the present invention, the phosphoric acid ester and/or the orthophosphoric acid is deactivated once the desired reaction is complete and before rearrangement reactions occur which impair the product. Deactivation may be achieved by neutralization, complexation or other reaction. This may straightforwardly be achieved, for example, by neutralizing the orthophosphoric acid and/or the acidic phosphoric acid ester with basic compounds. Any strong and weak bases are suitable for deactivation of the orthophosphoric acid and phosphoric acid esters, such as alkali metal hydroxides and the silanolates or alkoxides thereof, tetraalkylammonium hydroxides and amines. Examples of such substances are sodium hydroxide, potassium methanolate, tetramethylammonium hydroxide, triethylamine and hexamethyldisilazane. Precipitated and/or ground chalks are preferably used here. The resultant neutralization product may remain in the polymer or be removed by appropriate methods such as filtration and washing.

The present invention also provides crosslinkable RTV compositions which contain α,ω-dihydroxypoly (diorganosiloxanes) produced using the process according to the invention, crosslinking agents, catalysts, optionally together with fillers, plasticizers and further additives. The α,ω-dihydroxypoly(diorganosiloxanes) obtained from the reaction of the low molecular weight α,ω-dihydroxydiorganopolysiloxane with orthophosphoric acid and/or phosphoric acid esters and the subsequent deactivation, together with any additionally required components such as, for example, crosslinking agents, fillers, plasticizers, catalysts and further additives are incorporated into the α,ω-dihydroxypoly(diorganosiloxane).

For the purposes of the invention, crosslinking agents are any known prior art silanes with acetoxy, alkoxy, alkoxyalkoxy, aminoxy, amino, amido, acetamido and oxime groups. Examples of such compounds are methyltriacetoxysilane, ethyltriacetoxysilane, methyltrimethoxysilane, tetraethyl silicate, vinyltriethoxysilane, vinyltrimethoxysilane, tetrapropyl silicate, methyl-tris-(methylethylketoxime)silane, methylethoxy-di-N-methylbenzamidosilane, methyl-tris-(butylamino)silane and methyl-tris-(diethylaminoxy)silane.

For the purposes of the invention, fillers are, for example, reinforcing fillers, such as pyrogenic silica and carbon black, semi-reinforcing fillers, such as precipitated chalk and precipitated silica, non-reinforcing fillers, such as ground natural chalk, silica flour, metal silicates, carbonates, oxides and sulphates which are insoluble in water, the fillers optionally being be surface modified.

For the purposes of the invention, plasticizers are, for example, polydimethylsiloxanes with trimethylsiloxy end groups and a viscosity of 0.1 to 5 Pa·s.

For the purposes of the invention, suitable catalysts are any prior art catalysts customary in condensation-crosslinking polysiloxane compositions. Organic titanium and tin compounds are particularly preferred. Particularly preferred tin compounds are, for example, diorganotin dicarboxylates, such as dibutyltin dilaurate and dioctyltin maleate, together with solutions of diorganotin oxides in silicic acid esters. Preferred titanium compounds are, for example, alkyl titanates, such as tetraisopropyl titanate, tetrabutyl titanate and chelated titanium compounds, such as diisobutyl-bis-acetoacetic acid ethyl ester titanate.

For the purposes of the invention, further additives are, for example, adhesion promoters, pigments and fungicides. Preferred adhesion promoters are organofunctional silanes of the formulae:

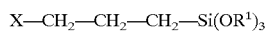

where

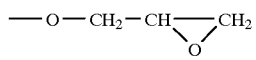

wherein $R^1$ means optionally substituted $C_1$–$C_8$ alkyl groups.

The crosslinkable mixture according to the invention is produced by homogeneously mixing the chain extended α,ω-dihydroxypolydiorganosiloxanes with the additionally required components.

The RTV compositions may be produced in any conventional prior art mixing units, such as for example planetary mixers, high speed mixers, butterfly mixers or continuously operated mixing screws.

The present invention also provides the use of the α,ω-dihydroxypoly(diorganosiloxanes) produced using the process according to the invention for the production of RTV compositions.

The following examples illustrate the invention, but do not limit it thereto.

PRACTICAL EXAMPLES

General note:

All viscosities were determined using a Haake rotational viscosimeter.

Example 1 a) 2.0 and b) 4.0 parts by weight of di-2-ethylhexyl phosphate were added at room temperature to 100 parts by weight of polydimethylsiloxane with $Si(CH_3)_2OH$ end groups, which had a viscosity of 0.5 Pa·s at 25° C. The viscosities of the mixtures rose sharply and are set forth in Table 1.

TABLE 1

| Time [minutes] | Viscosity [Pa · s] | |
| --- | --- | --- |
| | a) | b) |
| 5 | 2.0 | 2.0 |
| 50 | 8.9 | 58.4 |
| 100 | 127.7 | 177.2 |
| 1440 | 574 | 302 |

Example 2

A similar method was used as in Example 1 and a polydimethylsiloxane with $Si(CH_3)_2OH$ end groups and a viscosity of 0.5 Pa·s at 25° C. was mixed at room temperature with 4.0 wt. % of di-2-ethylhexyl phosphate and a) 0.6 wt. %, b) 1.25 wt. % and c) 2.5 wt. % of water. A sharp rise in viscosity was observed (see Table 2). As may be seen from the results in Table 2, the final viscosity of the mixtures after 24 hours falls as the water content rises.

TABLE 2

| Time [minutes] | Viscosity [Pa · s] | | |
|---|---|---|---|
| | a) | b) | c) |
| 22 | 4.9 | 4.9 | 4.9 |
| 50 | 60.4 | 62.4 | 61.4 |
| 64 | 107.9 | 102.0 | 103.0 |
| 1440 | 348 | 311 | 260 |

Example 3

A similar method was used as in Example 1 and a polydimethylsiloxane with $Si(CH_3)_2OH$ end groups and a viscosity of 50 Pa·s at 25° C. was mixed at room temperature with a) 0.5 wt. %, b) 1.0 wt. % and c) 2.0 wt. % of di-2-ethylhexyl phosphate. A sharp rise in viscosity was observed (see Table 3). As the concentration of catalyst increases, the rate of chain lengthening also rises.

TABLE 3

| Time [minutes] | Viscosity [Pa · s] | | |
|---|---|---|---|
| | a) | b) | c) |
| 1 | 43.6 | 46.5 | 46.5 |
| 5 | 51.5 | 58.4 | 66.3 |
| 20 | 72.3 | 93.1 | 109.9 |
| 30 | — | 134.6 | — |
| 40 | 114.8 | — | — |

The following examples demonstrate that polymers produced using the process according to the invention are suitable for the production of RTV compositions. The polymers and RTV compositions were produced in a "single vessel process", i.e. the α,ω-dihydroxypoly(diorganosiloxane) is initially produced and the RTV composition then formulated.

The α,ω-dihydroxypoly(diorganosiloxane) and the RTV compositions were produced in a 1 liter planetary mixer in accordance with the following examples. On completion of production, the compositions were transferred into plastic cartridges. Material for the further tests was taken from the sealed cartridges. The crosslinking behavior of the polysiloxane compositions was tested on a glass plate, for which purpose the pastes were applied in a layer thickness of 2 mm to an area of 40×60 mm. After 24 hours, the layer of material was cut, peeled off by hand and the underneath surface felt in order to determine whether the layer had cured through to the surface of the glass. The mechanical properties of the vulcanizates were determined by sheeting out the pastes to a thickness of 2 mm and testing them according to DIN 53 504 after 14 days' curing at 23° C. and 50% relative humidity. Hardness was tested according to DIN 53 505 after 14 days.

Example 4

55.0 parts by weight of a polydimethylsiloxane with $Si(CH_3)_2OH$ end groups, which had a viscosity of 50 Pa·s at 25° C., was mixed in a planetary mixer with 1.0 parts by weight of di-2-ethylhexyl phosphate. The viscosity of the mixture was 65 Pa·s immediately after mixing and rose to 130 Pa·s within 13 minutes. Chain lengthening was terminated by adding 40 parts by weight of a precipitated chalk having a BET surface area of 19 $m^2/g$ and the ester neutralized. 3.0 parts by weight of methyltrimethoxysilane, 1.0 part by weight of diisobutyl-bis-acetoacetic acid ethyl ester titanate and 0.1 part by weight of N-(2-aminoethyl)-3-aminopropyltrimethoxysilane were then added.

The paste cures completely within 24 hours to yield an elastomer. Mechanical testing produced the following results:

Hardness (DIN 53 505): 33 Shore A

Tensile strength (DIN 53 504): 2.74 MPa

Elongation at break (DIN 53 504): 942%

Tensile stress at 100% elongation (DIN 53 504): 0.55 MPa

Comparative Example 5

Example 4 was repeated, but the polymer was first mixed with the chalk and the di-2-ethylhexyl phosphate was then added.

The paste cures completely within 24 hours to yield an elastomer. Mechanical testing produced the following results:

Hardness (DIN 53 505): 36 Shore A

Tensile strength (DIN 53 504): 2.37 MPa

Elongation at break (DIN 53 504): 685%

Tensile stress at 100% elongation (DIN 53 504): 0.65 MPa

This example shows that the vulcanizate has a higher hardness and tensile stress, as well as lower elongation at break than Example 4. This is a clear indication that chain extension has occurred in the polymer in Example 4, while in Comparative Example 5, due to the different sequence of mixing, an immediate reaction occurred with the chalk, without chain extension of the polymer.

Comparative Example 6

Example 4 was repeated, but without adding di-2-ethylhexyl phosphate.

The paste cures completely within 24 hours to yield an elastomer. Mechanical testing produced the following results:

Hardness (DIN 53 505): 42 Shore A

Tensile strength (DIN 53 504): 2.59 MPa

Elongation at break (DIN 53 504): 446%

Tensile stress at 100% elongation (DIN 53 504): 0.88 MPa

Comparison of the results with Example 4 shows that an RTV-1 composition without any added di-2-ethylhexyl phosphate produces a very hard vulcanizate with high tensile stress and lower elongation at break. The poor mechanical properties very narrowly restrict the possible applications for such a product, due to its technical disadvantages.

It will be understood that the specification and examples are illustrative but not limitative of the present invention and that other embodiments within the spirit and scope of the invention will suggest themselves to those skilled in the art.

We claim:

1. In a process for the chain extension of a low molecular weight α,ω-dihydroxypoly(diorganosiloxane) wherein the siloxane is contacted with a chain extension catalyst, the improvement wherein said catalyst comprises at least one acidic phosphoric acid ester of the formula $$O=P(OR)_{3-m}(OH)_m \qquad (1),$$

where m is 1 or 2 and a R is a linear or branched $C_1$–$C_{30}$-alkyl, $C_2$–$C_{30}$-alkenyl or alkoxyalkyl, $C_5$–$C_{14}$-cycloalkyl or aryl radical, or a triorganylsilyl or diorganylalkoxysilyl radical, which may be identical or different within a molecule, or an acidic ester of polyphosphoric acid.

2. A process according to claim 1, wherein the low molecular weight α,ω-dihydroxypoly(diorganosiloxane) has a viscosity between 10 and 150000 mPa·s.

3. A process according to claim 1, wherein the chain extension is effected at a temperature of ≦40° C.

4. A process according to claim 1, wherein when the desired reaction is substantially complete and the product is deactivated once the desired reaction is substantially complete and before rearrangement reactions occur which impair the product.

5. A process according to claim 4, wherein the deactivation is effected with precipitated or ground chalk.

6. A process according to claim 1, wherein the low molecular weight α,ω-dihydroxypoly(diorganosiloxane) has a viscosity between 10 and 150000 mPa·s, the chain extension is effected at a temperature of ≦40° C., and when the desired reaction is substantially complete and before rearrangement reactions occur which impair the product, the product is deactivated with precipitated or ground chalk.

7. A process according to claim 1, wherein the catalyst comprises at least one member selected from the group consisting of dibutyl phosphate, di(2-ethyl-hexyl)phosphate, dihexadecyl phosphate, diisononyl phosphate, monoisodecyl phosphate, mono-(2-ethyl-hexyl)phosphate and di-trimethylsilyl phosphate.

8. In a process for preparing RTV compositions, the improvement which comprises preparing a vulcanizable α,ω-dihydroxypoly(diorganosiloxane) by the chain extension reaction of a low molecular weight α,ω-dihydroxypoly(diorganosiloxane) in the presence of a chain extension catalyst which comprises at least one acidic phosphoric acid ester of the formula $$O=P(OR)_{3-m}(OH)_m \qquad (I),$$

where m is 1 or 2 and

R is a linear or branched $C_1$–$C_{30}$ alkyl, $C_2$–$C_{30}$ alkenyl or alkoxyalkyl, $C_5$–$C_{14}$ cycloalkyl or aryl radical, or a triorganylsilyl or diorganylalkoxysilyl radical, which may be identical or different within a molecule, or an acidic ester of polyphosphoric acid, and adding the vulcanizable α,ω-dihydroxypoly(diorganosiloxane) to said RTV composition.

* * * * *